May 10, 1955 W. R. PETERSON 2,708,141
AUTOMATIC UNLOADER
Filed Oct. 20, 1951 3 Sheets-Sheet 1

INVENTOR.
Walter R. Peterson
BY Paul O. Pippel
Atty.

May 10, 1955 W. R. PETERSON 2,708,141
AUTOMATIC UNLOADER
Filed Oct. 20, 1951 3 Sheets-Sheet 2

INVENTOR.
Walter R. Peterson
BY Paul O. Pippel
Atty.

May 10, 1955 W. R. PETERSON 2,708,141
AUTOMATIC UNLOADER
Filed Oct. 20, 1951 3 Sheets-Sheet 3

INVENTOR.
Walter R. Peterson
BY Paul O. Pippel
Atty.

United States Patent Office 2,708,141
Patented May 10, 1955

2,708,141

AUTOMATIC UNLOADER

Walter R. Peterson, Hinsdale, Ill.

Application October 20, 1951, Serial No. 252,340

8 Claims. (Cl. 302—42)

This invention relates to unloading means for farm wagons or the like and more particularly to an automatic self-unloading system for efficiently removing material from a farm wagon and discharging the same to a silo or other storage place. This application is based upon my prior application Serial No. 165,680 filed June 2, 1950 for Automatic Unloader and is a continuation-in-part of such prior application and now abandoned.

Self-unloading farm wagons and conventional farm wagons modified to unload material automatically are not unknown in the farm equipment field. However, these wagons for the most part are not completely automatic and do not operate efficiently. Most of the wagons require the attention of one or more men and consume a great deal more power than is necessary if the system were efficient to remove a load of material from the wagon and deposit the same in a silo or other storage receptacle. That is, while the above mentioned devices probably all have provisions for moving the material to be unloaded to the discharge section of the wagon, it still remains necessary for one or more men at the discharge section to control the rate of transfer of the load to an ensilage blower or other means. It is well known that blowers have a greater capacity and efficiency if rotated at a particular speed. It is also a well-known fact that the rotational speed of an ensilage blower is varied by the rate at which the blower receives the material to be discharged therefrom. A blower will tend to speed up if no material is fed to it and, conversely, it will slow down if the rate of material is greater than the blower can handle at the particular speed. Hence, it is obvious that in order to insure the maximum capacity and efficiency of an unloading system employing a blower running at a speed indicative of its peak performance it is necessary to control the feed rate to the blower in such a manner as to prevent the blower speed from changing. It is, therefore, one of the objectives of the present invention to provide a device which will automatically, without the need of human attention, regulate the volume of flow delivered to the blower to obtain the highest possible capacity and efficiency in the unloading system.

Another object is to provide an unloading device which controls the volume of material flowing to the blower.

Still another object is the provision of an unloading device which automatically varies the feed rate to the blower with variations in the blower speed.

A further object is the provision of an unloading system which may be built as an integral part of a farm wagon or as an attachment for conventional farm wagons and which operates efficiently without the need of human attention.

A still further object is to provide a wagon unloading means which is controlled by the speed of a blower associated with the wagon.

The foregoing and other important objects and desirable features inherent in and encompassed by the invention, together with many of the purposes and uses thereof, will become readily apparent from a reading of the ensuing description in conjunction with the annexed drawings, in which.

Figure 1:
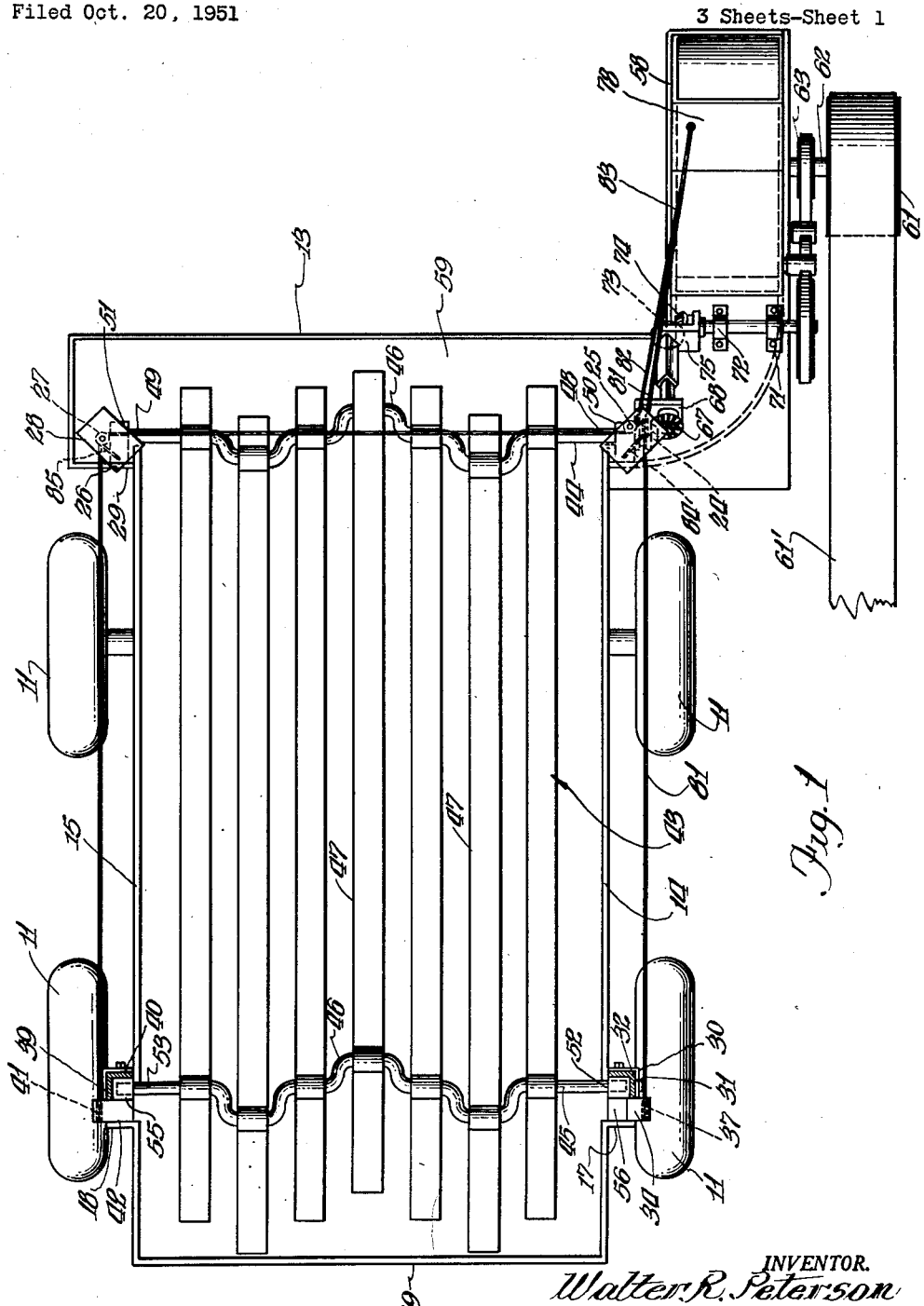
Fig. 1 is a plan view of the unloading system.
Figure 2:
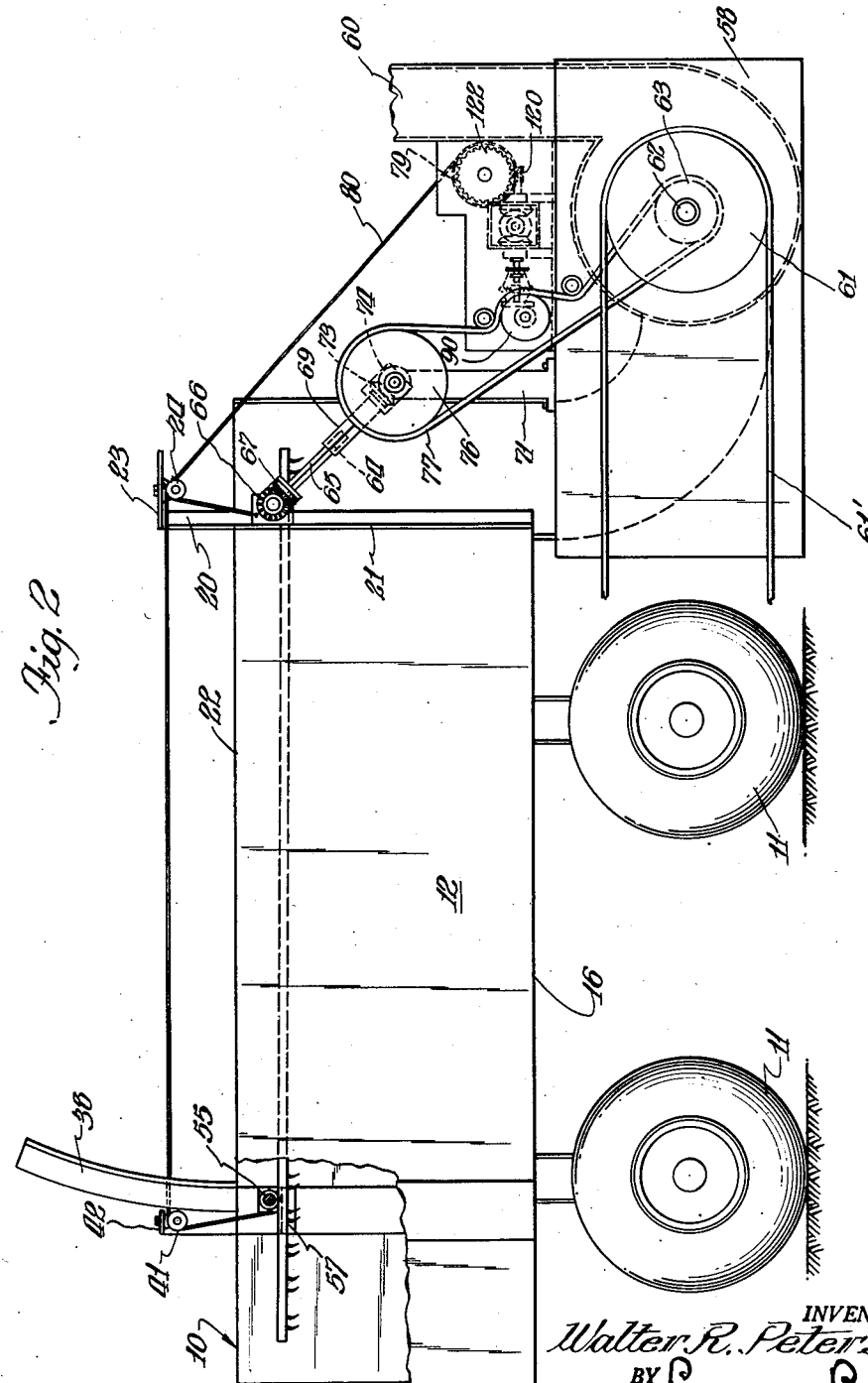
Fig. 2 is a side elevational view of the unloading system.

Referring to the drawings in detail wherein like reference characters designate like elements throughout the various views, there is shown in Figs. 1 and 2 a farm wagon 10 of the type used to transport silage, grain and other farm produce. The wagon 10 includes ground engaging wheels 11 for movably supporting a receptacle or hopper 12. The rear end 13 of the receptacle 12 is open or capable of being opened to provide a delivery area or zone for removing the material from within the receptacle. The side walls 14, 15 extend vertically from the receptacle bottom 16 and are each provided with an offset portion 17, 18 near the end wall 19, the purpose of which will be explained hereinafter.

Rigidly fastened to the side wall 14 adjacent the end 13 is a vertically disposed member 20 having an L-shaped cross section. One leg 21 of the member 20 projects laterally to provide a guide track. It will be noted that member 20 extends vertically beyond the top marginal edge 22 of side wall 14. A horizontally disposed plate or bracket 23 is rigidly attached to the upper extremity of the member 20. Depending downwardly from the plate 23 and mounted for rotation thereon is a cable sheave 24 adapted to rotate about a horizontal axis. Mounted adjacent sheave 24 is a second cable sheave 25 rotatably journaled on a vertical axis. Laterally spaced from member 20 is a similar member 26 secured to the side wall 15. A horizontally disposed cable sheave 27 is supported from a bracket 28 fastened to member 26. Laterally projecting legs 21, 29 of members 20 and 26, respectively, form the rear guide tracks for the wagon unloading means to be described hereinafter.

The front guide tracks include the offset portions 17 and 18. Extending arcuately from the top marginal edge 22 of side wall 14 is a member 30 which forms a continuation of surfaces 31 and 32 of the offset portion 17. A plate 34, rigidly supported adjacent member 30, is horizontally aligned with plate 23 associated with the rear guide track. Plate 34 carries a cable sheave 37 adapted to rotate about a horizontal axis. A second arcuate member 38, similar to member 30, extends from offset portion 18 to form a continuation of surfaces 39 and 40 of portion 18. A cable sheave 41 is rotatably mounted on a plate 42 adjacent member 38 in the same manner cable sheave 37 is carried adjacent arcuate member 30.

The unloading means, designated generally by numeral 43 includes a pair of spaced rotatable shafts 44, 45. Each shaft 44, 45 has a plurality of crank members 46 projecting radially from the rotational axes of the shafts; the crank members 46 are laterally spaced along the shafts 44, 45. A plurality of longitudinally extending horizontally disposed rake bars 47 each having one end rotatably attached to a crank member 46 formed on shaft 44 and the other attached in a similar manner to a crank member 46 carried by shaft 45. It will be obvious that rotation of shafts 44 and 45 will cause the rake bars 47 to reciprocate longitudinally. The ends 48, 49 of the shaft 44 are journaled in bearing blocks 50, 51 respectively. Blocks 50, 51 abut the legs 21, 29 of members 20 and 26 and are thus prevented from moving longitudinally toward the front end of the hopper 12. The legs 21, 29 to raise or lower the shaft 44 with respect to the bottom 16 of the hopper 12.

The ends 52, 53 of the other shaft 45 are rotatably mounted in a pair of bearing blocks 54, 55. Bearing block 54 is adapted to slide vertically along surfaces 31 and 32 of the offset portion 17 and the arcuate path formed by member 30. Bearing block 55 is likewise constructed to slide within offset portion 18 and along member 31. Positioned within each offset portion 17 and 18 is a bearing block supporting member 56, 57. The supporting members 56, 57 slidingly engage the interior surfaces of the offset portions 17 and 18 and are arranged to provide a movable support for the forward bearing blocks 54, 55.

Positioned immediately adjacent the rear end 13 of the receptacle 12 is a conventional ensilage blower 58 having a throat section 59 constructed to receive material from the delivery area of the wagon 10 and expel the material through a discharge conduit 60 to a silo or other storage place (not shown). Power is transmitted to the blower 58 by means of a belt 61' drivingly connected to a belt pulley 61 keyed or otherwise fastened to the rotor shaft 62 of the blower. It is to be understood that any conventional power source may be utilized to drive the belt 61' such as the power take-off shaft of a farm tractor (not shown). Keyed to the rotor shaft 62 inwardly of the pulley 61 is a second belt pulley 63.

As stated hereinbefore the rake bars 47 are reciprocated to move the load within the hopper 12 toward the delivery area by rotating shafts 44 and 45. Rotational movement is imparted to the shafts 44, 45 by means of a rotatable telescoping tumbling rod 64. Tumbling rod 64 comprises a male part 65 connected to one end 48 of the shaft 44 by means of a pair of bevel gears 66, 67. Gear 66 is keyed to shaft 44 and gear 67 is rotatable with the male part 65. The gears 66, 67 are held in meshing engagement by an L-shaped bearing bracket 68. A spline (not shown) is formed on the male part 65 which mates with a female part 69. The female part 66 has one end connected to one end of a rotatable stub shaft 70 journaled in a pair of laterally spaced standards 71, 72 by means of a pair of bevel gears 73, 74 which are held in meshing engagement by an L-shaped bracket 75. A belt pulley 76 is secured to the stub shaft 67 over which a belt 77 is trained to drivingly connect pulley 76 and pulley 63 which also engages the belt 77. It will be obvious that the above described structure is capable of reciprocating the rake bars 47 regardless of the vertical positioning of the bars within the hopper 12.

Mounted upon the blower housing 58 adjacent the discharge conduit 60 is a housing 78 for enclosing the control mechanism for the unloading means 43. Journaled within the housing 78 is a rotatable cable drum 79 to which one end of a cable 80 is attached. As shown in Fig. 1, cable 80 has a pair of cables 81, 82 attached thereto at point 83. Cable 81 is directed over sheaves 24 and 37 and has one end rigidly attached to bearing block supporting member 56. Cable 84, having one end attached to bearing block 50, is also attached to cable 81 and trained over sheave 24. Cable 82 is trained about sheave 25 and then directed transversely across the hopper 12, around cable sheave 27, and over sheave 41 where one end is attached to supporting member 57. Cable 85 has one end connected to cable 82 and its other end fastened to bearing block 51. It will be appreciated from a reading of the foregoing description of elements that the shafts 44, 45 and the rake bars 47 are supported horizontally within the hopper 12. It will also be evident that rotation of the cable drum vertically adjusts the unloading means. Rotation of the drum in one direction will pay out cable 80 to lower the unloading means 43, while rotation in the opposite direction will cause cable 80 to wind upon the drum to raise the unloading means.

Figure 3:
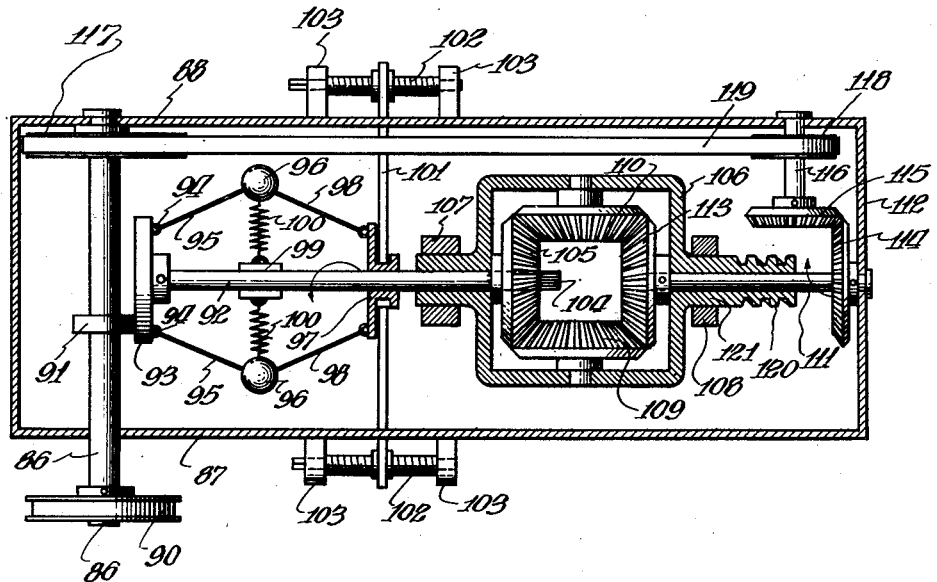
Fig. 3 is a detail view of the controlling mechanism for the unloading device.
Figure 4:
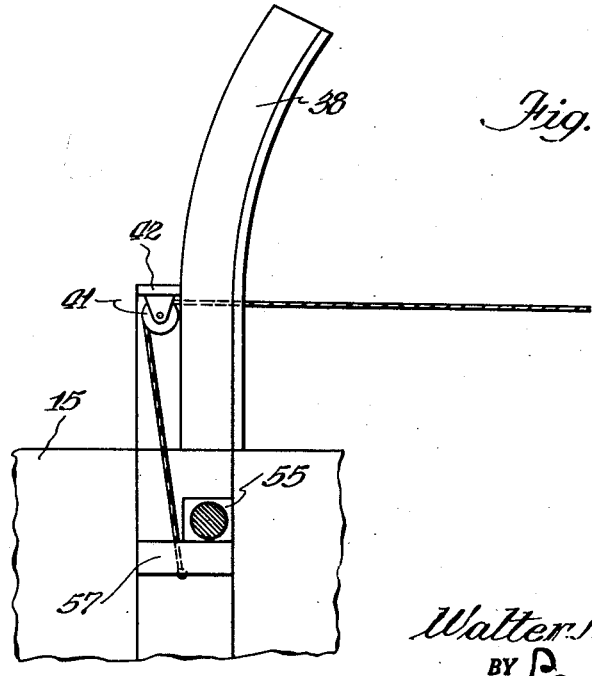
Fig. 4 is an enlarged view of one of the front guide tracks.

As shown in detail in Fig. 3, a shaft 86 is journaled in the side walls 87, 88 of the housing 78. One end 89 of the shaft 86 projects outwardly of the housing 78 and is provided with a belt pulley 90 which is driven by belt 77. Keyed to the shaft 86 and rotated thereby is a friction wheel 91. Rotatably supported within the housing 78 is a shaft 92 which is disposed normally to the shaft 86 and is provided with a disk member 93 at one end engageable with the friction wheel 91. The friction wheel 91 and disk member 93 are selected and arranged whereby the ratio of the speeds of shafts 86 and 92 is approximately 1 to 1.13. The shaft 92 together with disk 93 is adapted to move away from shaft 86 to break the driving connection between the disk member 93 and the friction wheel 91 when shaft 92 reaches a predetermined speed. A pair of diametrically spaced ears 94 project from the disk member 93 to provide the pivotal attaching structure for one end of links 95. The other ends of links 95 are pivotally connected to inertia members or balls 96. A collar 97 is slidably carried on shaft 92 to which one end of a second pair of links 98 are pivotally attached. The other ends of links 98 are attached to balls 96. A collar 99 is slidably carried on the shaft 92 intermediate the disk member 93 and the collar 97. Each inertia member 96 is resiliently connected to collar 99 by means of a helical spring 100. The collar 97 is prevented from moving longitudinally along the rotational axis of the shaft 92 by a transversely disposed rod 101 which allows the collar to rotate relative thereto. Each end of the rod 101 projects from the housing 78 and is provided with a threaded aperture for receiving threaded members 102. Threaded members 102 are restrained from moving longitudinally with respect to the housing 78 by pads 103. It will be obvious that simultaneous rotation of threaded members 102 will cause rod 101 and collar 97 to move longitudinally with respect to the shaft 92.

In operation, shaft 92 is rotated through the driving connection between the friction wheel 91 and the disk member 93. When the rotational speed of shaft 92 reaches a predetermined value, inertia members 96 will move outwardly overcoming the force exerted by the helical springs 100, causing disk member 93 and the shaft 92 to move to the right as viewed in Fig. 3. Hence, it will be appreciated that a simple, inexpensive governor is provided which functions to prevent the rotational speed of shaft 92 from exceeding a particular value. The speed at which the driving connection is broken may be varied by adjusting rod 101 longitudinally i. e. a greater rotational speed of shaft 92 will have to be attained before the driving connection is broken when the rod is moved to the left as viewed in Fig. 3. The opposite is true when the rod is moved to the right.

Shaft 92 is provided with a splined portion 104 upon which a beveled pinion gear 105 is carried. Gear 105 is positioned within a differential gear cage 106 and forms a part of a differential mechanism to be described. The cage 106 is rotatably supported by means of bearing members 107, 108. Rotatably supported within the cage 106 is a pair of oppositely disposed beveled idler gears 109, 110 which mesh with pinion gear 105. A shaft 111, having one end journaled in end wall 112, projects within the cage 106 and has a beveled gear 113 keyed thereto. Gear 113 is oppositely disposed from gear 105 and meshes with idler gears 109, 110. A second beveled gear 114, keyed to shaft 111 outwardly of the cage 106, engages a beveled gear 115 fastened to a shaft 116 rotatably supported by side wall 88. Shaft 116 is rotated by means of a belt transmission mechanism which includes a belt pulley 117 secured to shaft 86, a second belt pulley 118 keyed to shaft 116 and a belt 119 drivingly connecting the pulleys. Thus, it will be evident that shaft 111 is rotated at a speed proportional to the blower speed. A worm gear 120 is formed on a hub portion 121 of the cage 106 which meshes with a worm wheel 122 for rotating the cable drum 79 to wind or unwind the cable 80.

It is obvious from the foregoing description that if beveled gears 105 and 113 are revolving at the same speed in opposite directions, the cage 106 and the worm gear 120 will be stationary and cable 80 will not be wound or unwound from the cable drum 79. However, if bevel pinion 113 should revolve faster than pinion 105 the cage 106 will rotate at a speed proportional to the differential of speed between the gears 105 and 113 with the result that the drum 79 is rotated to unwind cable 80 and lower the rake bars 47. The rate at which the rake bars 47 are lowered will obviously be determined by the difference in the rates of speed of the two shafts 92 and 111.

In order to better understand the operation of the invention, assume the following operating conditions to exist.

1. Ensilage blower idle speed is 900 R. P. M.
2. Normal full load blower speed is 800 R. P. M.
3. Minimum permissible blower speed while operating is 750 R. P. M.
4. The governor mechanism is set to prevent shaft 92 from exceeding the speed of 790 R. P. M.

Having set up these conditions, the device will perform as follows. When first caused to reciprocate the rake bars 47 will engage very little material, perhaps none at all, depending on the height of the load within the hopper 12. If this is the case the blower will operate at idle speed, 900 R. P. M. Inasmuch as the governor mechanism is set at 790 R. P. M. there will be a speed difference between shafts 92 and 111 of 110 R. P. M. This speed difference will cause the differential cage 106 and the form gear 120 to rotate to lower the rake bars 47 at the maximum rate. As the rake bars 47 begin to engage the load they will deliver material to the blower causing the blower to slow down somewhat which, in turn, will decrease the rate of lowering. As increasing amounts of material are delivered to the blower by the rake bars the blower will continue to slow down until it reaches its normal full load operating speed assumed to be 800 R. P. M. At this blower speed the difference in rotational speeds of shafts 92 and 111 will only be 10 R. P. M., which will allow the cable 80 to unwind from the drum 79 at a rate to insure a uniform normal delivery of the material to the blower. If for any reason the blower speed should fall to 790 R. P. M. the worm gear will stop rotating and the rake bars will be lowered no further. However, if the blower speed should go below 790 R. P. M. and approach a clogging speed then the rotation of the differential cage and the worm gear will be reversed causing the drum to wind the cable thereon and thus raise the rake bars to relieve the blower and permit it to resume its proper operating speed. In the last mentioned situation shaft 92 exceeds the speed of shaft 111 by virtue of the fact that shaft 86 drives shaft 92 at a speed ratio of 1:1.13 while the rotational speed of shaft 111 is always the same as shaft 86.

Upon completion of the unloading operation, the blower blower speed may be intentionally reduced to a value above 700 R. P. M. and below 790 R. P. M. by lowering the speed of the tractor power take-off shaft or other source of power to take up cable and return the rake bars to their upper position in preparation for replacing an end gate or other closure means (not shown) at the rear of the hopper 12 and reloading the wagon.

The reloading of the hopper 12 is accomplished by pivoting shaft 45 and rake bars 47 about shaft 44 when the unloading means is in its upper position as shown in Fig. 2. Inasmuch as bearing blocks 54 and 55 are not positively connected to the supporting members 56 and 57 it will be evident that the blocks 54, 55 may move relatively thereto along the arcuate members 30 and 31 without interference with the supporting cables. When in this position the hopper 12 may be conveniently filled from its forward end.

The embodiment of the invention chosen for the purposes of illustration and rescription herein is that preferred for achieving the objects of the invention and developing the utility thereof in the most desirable manner.

It will be appreciated that the particular structural and functional aspects emphasized herein are not intended to exclude but rather to suggest such other adaptations and modifications of the invention as fall within the spirit and scope of the invention as defined in the appended claims.

What is claimed is:

1. A material unloading device for a receptacle comprising discharging means adapted to receive a flow of material from the receptacle and expel it, said discharging means including a substantially constant speed blower fan; feeding means for delivering material contained within the receptacle to the discharging means, said feeding means including a plurality of rake bars adapted to be reciprocated at a constant speed; means to adjust said rake bars vertically to vary the volume of flow of material to the discharging means including a cable connected to said rake bars and a cable drum whereby rotation of said cable drum in one direction will lower the rake bars and rotation in the opposite direction will raise the rake bars; and speed responsive means to rotate said cable drum in both directions at various speeds upon changes in the rotational speed of the blower fan as determined by the volume of flow of material received by the blower fan from the receptacle.

2. The material unloading device as set forth in claim 1 in which the speed responsive means includes a first shaft adapted to rotate at a speed directly proportional to the blower fan speed and a second shaft adapted to rotate at a constant speed, and means to rotate the cable drum at a speed directly proportional to the speed differential of the shafts.

3. A material unloading device for a receptacle comprising a blower fan adapted to receive a flow of material from the receptacle and expel it; a plurality of horizontally disposed rake bars positioned within the receptacle adapted to reciprocate at a constant speed for delivering material contained in the receptacle to the blower fan; means to adjust said rake bars vertically including a cable connected to said rake bars and a cable drum whereby rotation of said cable drum in one direction will lower the rake bars and rotation in the opposite direction will raise the rake bars to vary the volume of flow of material received by the blower fan; and actuating means controlled by the volume of flow to the blower fan for rotating said cable drum in both directions at various speeds.

4. The material unloading device for a receptacle as set forth in claim 3 in which the actuating means includes a first shaft adapted to rotate at a speed inversely proportional to the volume of material flowing to the blower fan and a second shaft adapted to rotate at a constant speed, and means to rotate the cable drum at a speed directly proportional to the speed differential of the shafts.

5. A material unloading device for a receptacle comprising discharging means for receiving material from the receptacle, said discharging means including a blower fan rotating at a substantially constant speed; feeding means for delivering the material contained within the receptacle to the discharging means, said feeding means including a plurality of horizontally disposed receiprocating rake bars; means to adjust said rake bars vertically to vary the volume of flow of material to the discharging means; and speed responsive means for controlling said means to adjust said rake bars whereby said rake bars are moved vertically in both directions at various speeds upon changes in the rotational speed of the blower fan.

6. A material unloading device for a receptacle comprising discharging means for receiving a substantially constant volume of flow of material from the receptacle; feeding means for delivering the material to the discharging means; means for adjusting said feeding means vertically to vary the volume of flow of material to the discharging means; and mechanical means responsive to a change in the volume of flow received by the discharging means to control said means for adjusting said feeding means whereby said feeding means is moved vertically in both directions at various speeds upon changes in the volume of flow of material received by the discharging means.

7. A material unloading device for a receptacle comprising discharging means for receiving material from the receptacle, said discharging means including a blower fan rotating at a substantially constant speed; feeding means for delivering the material contained within the receptacle to the discharging means; means for adjusting said feeding means vertically to vary the volume of flow of material to the discharging means; and speed responsive means to control said means for adjusting the feeding means upon changes in the rotational speed of the blower fan whereby said feeding means is moved vertically in both directions at various speeds.

8. A material unloading device comprising a material-filled receptacle open at one end; conveying means disposed within said receptacle for moving the material to the open end; means for adjusting said conveying means vertically to vary the volume of flow of material to the open end; discharging means for receiving the flow of material at the open end and expelling it; and means for regulating the means for adjusting the conveying means in response to the volume of flow of material the discharging means receives whereby said conveying means is moved vertically in both directions at various speeds.

References Cited in the file of this patent

UNITED STATES PATENTS

| | | |
|---|---|---|
| 2,496,876 | Kayser | Feb. 7, 1950 |
| 2,511,246 | Chamberlain | June 13, 1950 |